Patented Oct. 15, 1940

2,217,865

UNITED STATES PATENT OFFICE 2,217,865

DEHYDROGENATION CATALYST

Herbert P. A. Groll, Hamburg-Wellingsbuttel, Germany, and James Burgin, Oakland, Calif., assignors to Shell Development Company, San Francisco, Calif., a corporation of Delaware No Drawing. Original application April 26, 1935, Serial No. 18,386. Divided and this application July 4, 1939, Serial No. 282,812

8 Claims. (Cl. 23—236)

This invention relates to a novel process and catalyst for effecting the conversion of saturated hydrocarbons to olefinic compounds possessing the same number of carbon atoms to the molecule. More particularly, the invention relates to a catalytic dehydrogenation process which comprises contacting a paraffin hydrocarbon containing at least two carbon atoms with a novel aluminum oxide-chromium oxide catalyst at an elevated temperature whereby said paraffin is dehydrogenated to the corresponding valuable olefine.

It is an object of our invention to provide a practical and economical method for the technical scale conversion of the saturated aliphatic hydrocarbons, such as those contained in or derived from petroleum and petroleum products, to the industrially valuable olefines.

The olefines of the aliphatic series are valuable raw materials for many purposes. They are readily convertible into many products having economic importance such as dichlorides, chlorhydrins, alcohols, glycols, ethers, esters, olefine oxides, etc. In addition, the olefines and olefine polymers are useful as fuel and as components imparting anti-knock qualities to fuel mixtures.

Processes for effecting the dehydrogenation of hydrocarbons have been described in the literature. However, due to the difficulties of execution and the low yields of unsaturated hydrocarbons obtained, these known processes have not merited commercial application.

It is known that at the higher temperatures, in the absence of catalytic material, the paraffins pyrolyze and that olefines are formed therefrom. The mechanism of the pyrolysis involves, in addition to dehydrogenation, which occurs to a very limited extent, the disruption of the carbon chain resulting in the formation of saturated hydrocarbons and olefines possessing fewer carbon atoms than the treated paraffin and in addition, under the high temperatures necessitated, considerable losses are occasioned by carbon formation and polymerization. Accordingly, an object of our invention is to effect substantial dehydrogenation while substantially avoiding losses due to cracking.

Dehydrogenation can be effected, in the absence of catalysts at temperatures unfavorable to pyrolysis, however, the reaction proceeds so slowly that long periods of time are required before equilibrium is reached and the yields of olefines are commercially insignificant.

Numerous catalysts have been proposed for accelerating the dehydrogenation of paraffin hydrocarbons. Some of these catalysts are too active and their efficient use requires high space velocities and the use of relatively low temperatures if disruption of the hydrocarbon molecule is to be avoided. For example, nickel is a very active dehydrogenation catalyst yet it is unsuitable since its efficient use requires prohibitive space velocities and temperatures so low that equilibrium conditions are reached when only a small amount of the paraffin has been dehydrogenated. Less active catalysts have been suggested but marked disadvantages are also inherent in their use. The dehydrogenation can be effected in the presence of alumina; however, with this catalyst low space velocities and relatively high temperatures are required and as a result the rate of production of olefines is low and good conversions cannot be attained due to the excessive occurrence of cracking reactions. Chromium oxide has been suggested as a hydrogenation catalyst suitable for the dehydrogenation of paraffins. This catalyst is intermediate in activity between nickel and alumina. Marked disadvantages, similar to those attendant on the use of nickel, are also inherent in the use of chromium oxide. For the lower hydrocarbons, as propane, if substantial cracking is to be avoided prohibitively high space velocities are necessitated and, as a consequence, the conversion is too low to be practical. For example, at high space velocities and a temperature of 400° C. the maximum conversion of propane to propylene is only about 4%. None of the proposed catalysts are suitable for the efficient and economical technical scale conversion of paraffin hydrocarbons in general to the corresponding olefines at practical space velocities and at temperatures at which the optimum conversions are attained. As a consequence, none of the processes hitherto proposed have merited technical application.

Now we have found a novel catalyst for use in dehydrogenation reactions. Our catalyst is a compound catalyst comprising aluminum and chromium oxides with the former in substantial gravimetric excess of the latter. The catalyst functions as a true compound catalyst; it possesses the advantageous features of both alumina and chromium oxide, while devoid of the properties which render the use of either of these oxides alone undesirable. Its use provides a practical and economical process for the conversion of paraffins to olefines in hitherto unattainable yields. We may employ high space velocities and maintain a high production of olefines per time unit while employing temperatures at which optimum practical conversions are attained. Our catalyst can be economically prepared from readily obtainable and inexpensive materials; it possesses sufficient stability and resistance to poisoning within the desired temperature range and, in addition, when its catalytic activity is impaired, it may be substantially restored to its initial activity readily and inexpensively. Our catalyst may be advantageously employed under conditions of temperature and space velocity at which substantially no cracking occurs.

Our novel catalyst comprises the three elements aluminum, chromium and oxygen with the metals in combination with the oxygen and existing, under operating conditions as the metal oxides $Al_2O_3$ and $Cr_2O_3$. The catalyst may be prepared by impregnating alumina, preferably in the porous state, in any suitable solid form as powder, granules, pellets, etc., with a chromic acid solution of suitable concentration depending upon the desired chromic oxide content of the catalyst. Preferably the alumina is heated to about 300° C. under a reduced pressure, then allowed to cool to about room temperature and the aqueous $CrO_3$ solution added while the solid material is still under a reduced pressure. If desired, impregnation of the $Al_2O_3$ may be effected by contacting it with the aqueous $CrO_3$ solution and alternately boiling and cooling. Prior to its use in the execution of the invention, the dried impregnated material is packed in the required amount in the reaction tube and heated to reaction temperature while the paraffin hydrocarbon is passed through it at a suitable velocity. The hydrocarbon acts as a reducing gas when a sufficiently high temperature has been reached and the $CrO_3$ is reduced to $Cr_2O_3$.

Other suitable modes of preparing the catalyst will be apparent to those skilled in the art to which the invention appertains. Conditions of preparation should be such that the catalytic material is obtained in a very porous form, since physical structure may play a large part in its effectiveness. Our catalyst may or may not be used in the presence of a suitable substance capable of acting as a promoter.

We prefer to consider the catalyst with respect to its chromium oxide content expressed in per cent by weight of the catalyst mass. We may advantageously employ catalysts containing from about 6% to about 40% of $Cr_2O_3$; but, in general the process is executed with catalysts containing from about 15% to about 25% of $Cr_2O_3$.

The $Al_2O_3$-$Cr_2O_3$ catalysts retain their activity over relatively long periods of use. Loss of activity with use under normal conditions is usually due to decrease of surface and/or porosity caused by carbon and/or tar deposition which occurs to a small extent during the dehydrogenation. The initial activity of the fouled catalyst may be readily and substantially restored by the simple and economical procedure of passing air or another suitable oxygen-containing gas through the heated material for a sufficient time to effect removal of the contaminating material by oxidation. The fouled catalyst is preferably maintained at a temperature of from about 400° C. to about 700° C., in the dehydrogenating tube or another container, and air passed over it at an hourly space velocity of from about 600 to 900 until the desired degree of activity has been restored. At a temperature of about 500° C., virtually complete reactification usually requires about one hour.

The $Al_2O_3$-$Cr_2O_3$ catalysts are preferably employed at temperatures of from about 500° C. to about 700° C., although higher and lower temperatures may, in some cases, be used. At lower temperatures, the catalysts are less active and such long contact periods are required, if a substantial conversion is desired, that cracking may occur to an undesirable extent. At temperatures substantially above 700° C., impractical space velocities are essential if cracking is to be substantially avoided. As a result, the conversions are too low due to the fact that equilibrium is not attained. Although, the catalyst may possess its optimum activity at the higher temperatures, the rate of loss of activity is also greater, making the process generally more economically executed in the lower temperature range at contact times favoring equilibrium conditions and the attendant high conversions.

The catalyst usually in granular form, is employed in manners customary in dehydrogenation processes of this type. A quantity of said catalyst may be maintained in a suitable catalyst chamber at the desired temperature through which the treated material, preferably in the vapor phase, may be passed at the desired space velocity and under the desired pressure. The term "space velocity" as used herein may be defined as the unit volume of gaseous material to be treated, measured at about 0° C. and atmospheric pressure, contacted with a unit volume of catalyst per hour. In the execution of our invention, the space velocity employed when optimum conversions are desired is dependent upon the particular hydrocarbon or mixture of the hydrocarbon treated, upon the chromium oxide content of the catalyst and upon the temperature of execution.

Under optimum conditions of temperature and catalyst composition, a high conversion of propane to propylene is attained at space velocities of from about 1200 to about 1500, while with the butanes a desired space velocity is from about 600 to about 840 and ethyl benzene is advantageously treated at a space velocity of about 450.

With each particular hydrocarbon or hydrocarbon-containing mixture treated, the temperature of execution and the chromium oxide content of the catalyst can be so regulated that we may employ a practical space velocity and obtain a practical conversion at a rate that is not detrimental to the activity of the catalyst. When operating in the desired temperature range, usually from 500° C. to 700° C., to obtain the optimum conversion per passage of the gaseous material in contact with the catalyst, the space velocity most advantageously employed is dependent upon the chromium oxide content of the catalyst. For example, the optimum space velocity increases as the chromium oxide content of the catalyst increases. When the catalyst contains less than about 6.0% of chromium oxide, such low space velocities are usually necessary that the conversion proceeds at an impractical rate and with excessive losses due to cracking. Catalysts containing more than about 40% chromium oxide usually require such high space velocities that their use is impractical both as regards the low conversions attained and the relatively shorter life of the catalyst.

The dependence of space velocity upon the chromium oxide content of the catalyst to obtain optimum conversions per single pass may be illustrated with reference to results obtained in effecting the conversion of normal butane to butylenes. Comparative results were obtained by passing previously dried gaseous n-butane through 35 cc. of catalyst contained in a 1.1×33 cm. silica tube heated to 550° C. When the catalyst contained about 6.0% chromium oxide, an optimum conversion of 30% was obtained at a gas velocity of 110 cc./min. or a space velocity of 188.4. The same amount of catalyst containing about 40% chromium oxide required a gas velocity of about 500 cc./min. or a space velocity of about 858 to obtain a conversion of about 25%. In general, with hydrocarbons containing more than three carbon atoms, it appears undesirable to employ space velocities much over 750 and, accordingly, we prefer to employ catalysts which render the use of such space velocities practical, that is, catalysts generally containing less than 40% of chromium oxide.

A greater production of the corresponding olefine per time unit and per quantity of catalyst employed is attained when the higher space velocities are used; however, this advantage is offset by the lower olefine content of the effluent gas and by the relatively much shorter period of activity of the catalyst. The rate of loss of activity of the catalyst increases rapidly as the space velocity is increased. Loss of the activity of the catalyst in the absence of specific catalyst poisons is probably due to deposition of carbon on the surface thereof in accordance with the reaction $C_nH_{2n+2} \rightarrow nC + (n+1)H_2$ which reaction occurs simultaneously with the dehydrogenation reaction but at a much lower rate. The velocity of this side reaction appears to be directly proportional to the concentration of hydrocarbon in the reaction chamber and, accordingly, the rate of carbon deposition and the ratio of hydrogen to olefine is much greater at the higher space velocities and the rate of activity loss of the catalyst is accelerated. Reactivation of the catalyst as herein described comprises oxidation of the deposited carbon whereby the activity of the catalyst is restored.

The process is preferably conducted at ordinary or moderately reduced pressures, but the same may also be executed at pressures moderately in excess of atmospheric. The reaction may or may not be effected in the presence of a suitable diluent. Suitable diluents comprise all gases and vapors which have substantially no action on the reactants and products or the catalyst under conditions at which the invention is executed.

Our process of dehydrogenation employing a catalyst consisting of aluminum oxide and chromium oxide is applicable with excellent results to the conversion of saturated hydrocarbons to unsaturated hydrocarbons. The same is particularly applicable to the conversion of the paraffins to olefines. The paraffins containing a plurality of carbon atoms such as ethane, propane, the butanes, the pentanes, the hexanes, the heptanes and the like may be treated by our method and converted in excellent yields to the corresponding olefines. Such a straight or branch chain hydrocarbon may be linked to a cyclic radical as of the aromatic, alicyclic series or the paraffin may comprise a saturated alicyclic structure. It is to be understood that suitable substitution products of the above mentioned compounds are also contemplated.

The saturated compounds may be treated severally or mixtures comprising more than one species of hydrocarbon may be treated. If desired, mixtures of one or more species with a relatively inert substance which will exist in the gaseous state under operating conditions are also suitable. For example, dehydrogenation may be effected in the presence of stable olefines, stable hydrocarbons, nitrogen, etc. The use of such an inert diluent provides a suitable means of increasing the conversion of the hydrocarbon treated by decreasing its partial pressure in the reaction mixture. If desired, the reaction may be effected in the initial presence of added hydrogen. In addition to acting as a diluent, the hydrogen, due to the fact that it is a good heat conducting gas, permits excellent conversions due to the much more uniform temperature which may be maintained in the reaction mixture. The presence of considerable quantities of hydrogen operates, in accordance with the law of mass action, to repress the dehydrogenation reaction; however, this disadvantage is more than offset by the advantages attendant on the heat conductivity of the hydrogen.

Another advantageous manner of decreasing the partial pressure of the treated hydrocarbon comprises adding a suitable hydrogen acceptor to the hydrocarbon to be dehydrogenated. The dehydrogenation may be effected in the presence of an unsaturated hydrocarbon whose paraffin equivalent is less easily dehydrogenated than the compound treated. For example, sufficient ethylene may be mixed with a hydrocarbon higher than ethane so that the hydrogen liberated from the treated hydrocarbon hydrogenates the ethylene to ethane. The hydrogen acceptor is chosen with respect to the hydrogen donator and employed under such conditions that the former is more readily hydrogenated than the dehydrogenation product of the latter while the hydrogenation product is less readily dehydrogenated than the hydrogen donator.

Another suitable means of decreasing the partial pressure of the treated hydrocarbon comprises effecting the dehydrogenation under a subatmospheric pressure.

The process may be applied to substantially pure hydrocarbons or mixtures thereof or to their mixtures such as occur in petroleum, natural gas, etc. Suitable hydrocarbon mixtures may be obtained by the destructive distillation or hydrogenation of coal, peat, pitches, tars, etc., as well as by the pyrogenesis of petroleum, petroleum products, shale oils, etc., as well as from the extraction, distillation, transformation and the like products of the same. Highly saturated hydrocarbon motor fuels such as gasoline containing but small amounts of olefines, can be improved in accordance with our process by passing the same over the catalytic material under the conditions herein specified. In this manner, the amounts of unsaturates in the fuel can be increased and its anti-knock qualities enhanced.

Technical paraffin-olefine-containing mixtures such as the propane-propylene cut, the butane-butylene cut, the pentane-amylene cut, etc., may be treated by our method and the ratio of olefine to paraffin increased, or such a cut or the original mixture may be treated by any suitable means such as fractionation, condensation, absorption, extraction and the olefines removed therefrom prior to treatment by our method.

While our invention has been described with particular reference to its use as a means of dehydrogenating saturated hydrocarbons to the corresponding olefinic compounds, it is to be understood that the same is also applicable with excellent results to the dehydrogenation of unsaturated hydrocarbons to still more unsaturated compounds. For example, by our method, cyclohexene and cyclo-hexadiene may be dehydrogenated to benzene, tetrahydronaphthalene to naphthalene, etc.

The following examples are introduced for the purpose of illustrating modes of executing our invention and the results thereby attained, but the invention is not to be considered as limited to the specific materials or conditions specified therein.

Example I

An aluminum oxide-chromium oxide catalyst was prepared by impregnating granules of porous calcined alumina with chromic acid. About 35 cc. of this catalytic material was packed in a quartz reaction tube having an inside diameter of 10.4 mm. and heated over a length of about 65 cms. The tube was heated to about 575° C. while propane was passed through it to reduce the $CrO_3$ to $Cr_2O_3$. The resulting catalyst mass contained about 20.0% of $Cr_2O_3$.

The catalyst mass was maintained at a temperature from about 575° C. to about 585° C. while propane was passed through it at a space velocity of from 1200 to 1500 for a period of two hours. The average conversion of propane to propylene was about 30%. At the end of four hours the average conversion was 26.3%.

After four hours of conversion, the catalyst was regenerated by passage of air over the catalyst mass at a space velocity of from about 600 to 720 and a temperature of about 580° C. The catalyst was substantially completely regenerated by treatment for about one hour. With the regenerated catalyst, an average conversion of about 25.1% was obtained over a period of about four hours.

Example II

Normal butane was passed over about 35 cc. of aluminum oxide-chromium oxide catalyst containing about 17% of chromium oxide in the form of the chromium oxide $Cr_2O_3$. The gaseous butane was passed at space velocity of from about 600 to 720 (gas velocity about 330 to 440 cc./min.) over the catalyst contained in a quartz tube having an inside diameter of 1.3 cm. and heated to a temperature of about 540° C. to about 560° C.

The results of this experiment are shown in the following table:

Butane passed through tube=51.0 liters
Average conversion to butylene=31.0%
Volume of butylenes produced=15.8 liters
Butylenes produced/gm. catalyst=1.13
Butylene content of effluent gas=23.3%

*Composition of effluent gas*—(By weight)

Butane=60.0%
Butylenes=29.5%
Hydrogen=1.5%
Other saturated and unsaturated hydrocarbons=9.0%

The experiment was run in cycles of conversion and regeneration. When the conversion of butane to butylene reached about 25%, the catalyst was regenerated by passing air over it at a space velocity of from 600 to 720 at a temperature of about 550° C. for about one hour. The catalyst after a great many regenerations only showed a slight decrease in activity.

Straight pyrolysis of normal butane in the absence of a catalyst yields only 5% of butylene; the main reaction comprising splitting to form methane, propylene, ethane and ethylene.

Example III

An aluminum oxide-chromium oxide catalyst was prepared by heating granules of $Al_2O_3$ at a temperature of about 300° C. for about one hour under a subatmospheric pressure. The $Al_2O_3$ was cooled and, while it was still under a reduced pressure, an aqueous solution of $CrO_3$ was added thereto. The dried catalyst was packed in a quartz tube and heated to a temperature of about 550° C. while isobutane was passed through to convert the $CrO_3$ to $Cr_2O_3$. When the reduction was complete, the catalyst mass contained about 17% $Cr_2O_3$.

The dehydrogenation was effected by passing isobutane, at a space velocity of about 756, over the $Al_2O_3$—$Cr_2O_3$ catalyst maintained at a temperature of about 550° C. Over a period of two hours, an average conversion of about 34% isobutane to isobutylene was effected. After two hours of continuous operation the catalyst was regenerated with air at about 550° C. for one hour. Approximately the same conversion was attained with the regenerated catalyst.

Example IV

A quartz tube having an inside diameter of 1 cm. was packed with about 26 cc. of a granular aluminum oxide-chromium oxide catalyst containing from 17% to 20% chromium oxide. The tube and its contents were heated to about 600° C. and gaseous cyclohexane was passed over the catalyst at an average space velocity of about 510. About 70% of the material passed through the catalyst was collected as a liquid. The liquid condensate smelled strongly of benzene and on analysis it was found that about 75% of the liquid condensate was benzene.

Example V

Ethyl benzene vapor was passed over an aluminum oxide-chromium oxide catalyst, containing from 17% to 20% chromium oxide, heated to a temperature of about 630° C. The ethyl benzene vapor was passed over the catalyst at a space velocity of about 450. About 84 gm. of ethyl benzene were passed through the reaction tube and 74.6 gm. of liquid condensate were collected. Distillation of the condensed liquid showed that a yield of about 25% styrene was obtained on one passage of the ethyl benzene over the catalyst. The bottoms of the distillation consisted of a gum-like resin which was probably a styrene polymer or condensation product.

Our invention may be executed in a batch, intermittent or continuous manner. The extent of conversion can be increased by withdrawing conversion products from the system. For example, one or a plurality of conversion stages may be in communication with one or more stages wherein the treated gaseous mixtures are treated for the partial or complete removal of olefines and the unconverted paraffin-containing mixture treated in the same or another dehydrogenating unit. As an example of a suitable means of executing our invention in a continuous manner, we may employ a plurality of dehydrogenating units in communication with the storage vessel containing the material to be treated and utilize one or more reaction units while one or more are out of use. When the catalyst loses its activity to the extent that the conversion per pass is no longer practical, the material to be treated is diverted to the reactors not previously used or to those containing activated material. While conversion is effected in one or more dehydrogenating units, the used catalytic material in others may be regenerated with air. The exit gases can be conveniently used in the production of alcohols by having the dehydrogenating units in communication with an absorption unit wherein the olefines present are absorbed in a solution of a strong mineral oxy-acid such as sulfuric and the like. Gases thus partially or substantially denuded of olefines can then be recirculated through the conversion units. Alternatively the exit gases may be substantially freed of hydrogen by bringing them into contact with a suitable hydrogen-binding material such as an easily reducible metal oxide as CuO, etc., and the treated gas recirculated until substantially complete conversion to unsaturates has been effected. If desired a suitable hydrogen-binding agent capable of reacting with hydrogen under dehydrogenating conditions may be present. It is seen that our process also provides a novel process for the production of hydrogen which gas is useful for a wide variety of purposes.

While we have described our novel catalyst with particular reference to its use as an agent for accelerating the dehydrogenation of organic compounds, it is to be understood that the same may be used with excellent results to catalyze a great variety of other chemical reactions such as dehydration, condensation, molecular rearrangement and the like. Our catalyst may be advantageously employed as an agent for catalyzing the conversion of aliphatic alcohol to the corresponding olefines. The same is also useful as a catalytic agent for the conversion of unsaturated alcohols to their corresponding isomeric saturated aldehydes and ketones.

The terms "dehydrogenation" and "dehydrogenating" as used throughout the specification and the appended claims are intended to exclude those reactions in which oxygen or its equivalent combines with a hydrogen-containing compound to form a compound containing less hydrogen. Such reactions are entirely different from the type of reaction which occurs in accordance with our invention, whereby hydrogen atoms are split from hydrogen-containing compounds resulting in the production of an unsaturated compound and molecular hydrogen.

This application is a division of our copending application, Serial No. 18,386, filed April 26, 1935, which matured into United States Patent No. 2,184,234 on December 19, 1939.

While we have described our invention in a detailed manner and provided specific examples illustrating suitable modes of executing the same, it is to be understood that modifications may be made and that no limitations other than those imposed by the scope of the appended claims are intended.

We claim as our invention:

1. As a dehydrogenation catalyst: an intimate mixture of aluminum oxide and chromium oxide comprising calcined alumina and chromium oxide incorporated in the surface of said alumina and present in the amount of from 15% to 25% of the catalyst mass.

2. As a dehydrogenation catalyst, an intimate mixture of aluminum oxide and chromium oxide comprising calcined granular alumina and deposited chromium oxide adherent to each granule, the catalyst mass containing from about 6% to 40% chromium oxide.

3. As a dehydrogenation catalyst: a mixture of the oxides of aluminum and chromium comprising alumina and chromium oxide incorporated in the surface of said alumina and present in the amount of from 6% to about 40% of the catalyst mass.

4. As a dehydrogenation catalyst: a mixture essentially consisting of the oxides of aluminum and chromium and containing from 15% to 25% chromium oxide calculated as $Cr_2O_3$.

5. As a catalyst: a mixture essentially consisting of the oxides of aluminum and chromium and comprising an aluminum oxide impregnated with from about 6% to about 40%, of the catalyst mass, of a chromium oxide.

6. As a catalyst: a mixture essentially consisting of the oxides of aluminum and chromium and containing from 6% to 40% by weight of chromium oxide.

7. A compound catalyst essentially consisting of oxides of aluminum and chromium, in which combination each oxide is present in a substantial amount with the aluminum oxide predominating over the chromium oxide by at least the ratio of 1.5 to 1 by weight.

8. A dehydrogenation catalyst which essentially consists of aluminum oxide and an oxide of chromium, and was formed by the addition of chromium trioxide to the aluminum oxide.

HERBERT P. A. GROLL.
JAMES BURGIN.